(12) United States Patent
Hissong (10) Patent No.: US 8,403,257 B2
(45) Date of Patent: Mar. 26, 2013

(54) HYDRAULIC GROUND PROPULSION SYSTEM

(75) Inventor: Erin T. Hissong, Vestal, NY (US)

(73) Assignee: BAE Systems Controls Inc., Johnson City, NY (US)

( * ) Notice: Subject to any disclaimer, the term of this patent is extended or adjusted under 35 U.S.C. 154(b) by 357 days.

(21) Appl. No.: 12/959,938

(22) Filed: Dec. 3, 2010

(65) Prior Publication Data
US 2012/0138734 A1 Jun. 7, 2012

(51) Int. Cl.
*B64C 25/50* (2006.01)
(52) U.S. Cl. ............... 244/50; 244/104 FP; 244/103 R
(58) Field of Classification Search ............ 244/50, 244/103 R, 100 R, 111, 58, 102 R, 104 FP; 74/606 R; 192/55.1, 56.5
See application file for complete search history.

(56) References Cited

U.S. PATENT DOCUMENTS

| | | | |
|---|---|---|---|
| 3,034,748 A * | 5/1962 | Koup | 244/50 |
| 3,586,117 A * | 6/1971 | Le Tourneau | 180/204 |
| 3,633,701 A * | 1/1972 | LeTourneau et al. | 180/204 |
| 3,711,043 A * | 1/1973 | Cameron-Johnson | 244/50 |
| 3,762,670 A * | 10/1973 | Chillson | 244/50 |
| 3,807,664 A * | 4/1974 | Kelly et al. | 244/50 |
| 3,874,619 A * | 4/1975 | Collins et al. | 244/50 |
| 4,193,698 A * | 3/1980 | Gartner | 366/130 |
| 5,193,577 A * | 3/1993 | de Koning | 137/516.29 |
| 6,023,134 A * | 2/2000 | Carl et al. | 318/140 |
| 6,450,448 B1 * | 9/2002 | Suzuki | 244/104 FP |
| 7,237,748 B2 * | 7/2007 | Sullivan | 244/111 |
| 7,445,178 B2 * | 11/2008 | McCoskey et al. | 244/50 |
| 7,469,858 B2 * | 12/2008 | Edelson | 244/103 S |
| 8,136,761 B2 * | 3/2012 | Kiyosawa | 244/103 R |
| 2003/0167763 A1 * | 9/2003 | Farkas | 60/428 |
| 2007/0158497 A1 | 7/2007 | Edelson et al. | |
| 2007/0282491 A1 * | 12/2007 | Cox et al. | 701/3 |
| 2009/0114765 A1 * | 5/2009 | Cox et al. | 244/50 |
| 2009/0118874 A1 * | 5/2009 | White et al. | 701/3 |
| 2009/0294578 A1 * | 12/2009 | Humphrey | 244/50 |
| 2010/0006699 A1 * | 1/2010 | Sullivan | 244/111 |
| 2011/0155846 A1 * | 6/2011 | Bulin et al. | 244/50 |
| 2011/0290933 A1 * | 12/2011 | Cros et al. | 244/50 |
| 2011/0297786 A1 * | 12/2011 | Sweet et al. | 244/103 R |
| 2012/0018574 A1 * | 1/2012 | Bayer | 244/50 |
| 2012/0168557 A1 * | 7/2012 | Edelson et al. | 244/50 |
| 2012/0217339 A1 * | 8/2012 | Gilleran et al. | 244/50 |

FOREIGN PATENT DOCUMENTS

| | | |
|---|---|---|
| JP | 4193698 A | 7/1992 |
| JP | 5193577 A | 8/1993 |

* cited by examiner

*Primary Examiner* — Christopher P Ellis
*Assistant Examiner* — Medhat Badawi
(74) *Attorney, Agent, or Firm* — Scully, Scott, Murphy & Presser, P.C.

(57) ABSTRACT

A hydraulic ground propulsion system for an aircraft. The system comprises a wheel, axel, an aircraft power interface device, an electric motor, a hydraulic system, a drive assembly and a controller. The wheel is rotatably coupled to the wheel axel. The aircraft power interface device interfaces an aircraft power source. The electric motor is coupled to the aircraft power interface device and receives power from the aircraft power source through the aircraft power interface device. The hydraulic system is driven by the electric motor. The drive assembly mechanically couples the wheel axel to the hydraulic system. The drive assembly is mechanically driven by the hydraulic system. The drive assembly transfers energy from the hydraulic system to the wheel axel. The controller controls the electric motor and the hydraulic system based upon a pilot torque command.

27 Claims, 6 Drawing Sheets

HYDRAULIC GROUND PROPULSION SYSTEM

FIELD OF THE INVENTION

This invention relates to an aircraft ground propulsion system. More particularly, the invention relates a hydraulic ground propulsion system.

BACKGROUND

During taxi an aircraft uses a ground propulsion system to control the speed and torque of landing gear axels and wheels. Typically, aircraft engines are used for propulsion power. However, using the aircraft engines for taxi is inefficient and poses safety risk to ground personal. Alternatively, a towbar/wheel tug can be used. However, the use of a towbar/wheel tug for push back and maneuvering creates a dependence on ground support personal and equipment. Additionally, the aircraft must carry additional weight in the towbar when operating between remote runways. The towbars can weigh up to several hundreds of pounds.

Another alternative is the use of one or more high powered electric motors to propel the aircraft for taxi. These electric motors require liquid jacket cooling to avoid exceeding the maximum temperature of the motor. However, the coolant used for cooling the motors can freeze during flight due to low ambient temperature in a landing bay area. Additionally, routing coolant lines through a folding landing gear is difficult. Furthermore, the use of electric motors requires the use of inverters, rectifiers and amplifiers to vary the motor speed. These devices also require cooling.

SUMMARY OF THE INVENTION

Accordingly, disclosed is a hydraulic ground propulsion system that can vary the speed and torque of a wheel axel for taxi. The hydraulic ground propulsion system 201 does not use the power from the engines, but rather has a power takeoff from an auxiliary power source.

The system comprises at least one wheel, at least one axel, an aircraft power interface device, an electric motor, a hydraulic system, a drive assembly and a controller. The wheel is rotatably coupled to the wheel axel. The electric motor is coupled to the aircraft power interface device and receives power from the auxiliary power source through the aircraft power interface device. The hydraulic system is driven by the electric motor. The drive assembly mechanically couples the wheel axel to the hydraulic system. The drive assembly is mechanically driven by the hydraulic system. The drive assembly transfers energy from the hydraulic system to the wheel axel. The controller controls the electric motor and the hydraulic system based upon a pilot torque command.

The controller can control the electric motor and the hydraulic system based upon both a pilot torque command and at least one environmental parameter. The at least one environmental parameter can be, but is not limited to, wheel speed, aircraft status, e.g., in air or on ground, hydraulic fluid temperature and drain case pressure.

The controller independently controls the variable displacement hydraulic pump and the variable displacement hydraulic motor.

The electric motor is a constant speed AC motor that provides a power source to the hydraulic system.

The hydraulic system comprises a fluid reservoir, a variable displacement hydraulic pump, a charge pump, and a variable displacement hydraulic motor. The fluid reservoir stores hydraulic fluid for the hydraulic system. The variable displacement hydraulic pump variably supplies pressurized hydraulic fluid based upon a first displacement control signal from the controller. The electric motor provides displacement torque to the variable displacement hydraulic pump. The charge pump has a first and second end. The first end is attached to the fluid reservoir and the second end is attached to the variable displacement hydraulic pump. The charge pump pumps the hydraulic fluid from the fluid reservoir to the variable displacement hydraulic pump. The charge pump is driven by the electric motor. The variable displacement hydraulic motor variably provides mechanical energy to the drive assembly based upon a second displacement control signal from the controller. The variable displacement hydraulic motor is supplied with the pressurized hydraulic fluid.

The hydraulic system further comprises first and second hydraulic lines. The first hydraulic line has a first and second end. The first end is connected to the variable displacement hydraulic pump and the second end is connected to the variable displacement hydraulic motor. The second hydraulic line also has a first and second end. The first end is connected to the variable displacement hydraulic motor and the second end is connected to the variable displacement hydraulic pump.

The hydraulic system further comprises a first and second hydraulic pressure control lines. The first hydraulic pressure control line is attached to the variable displacement hydraulic pump and is used to adjust a displacement of the variable displacement pump based upon a first displacement control signal from the controller. The second hydraulic pressure control line is attached to the variable displacement hydraulic motor and is used to adjust a displacement of the variable displacement motor based upon the second displacement control signal from the controller.

The variable displacement hydraulic pump and variable displacement hydraulic motor are bi-directional.

The variable displacement hydraulic motor, the drive assembly, the at least one wheel axel and the at least one wheel are located in a wheel hub. The variable displacement hydraulic pump, the fluid reservoir, the controller and the electric motor are located in a landing gear bay.

When the aircraft is within a preset period of time prior to landing, the controller activates the variable displacement hydraulic pump with the variable displacement hydraulic motor set to a neutral mode.

The hydraulic system further comprises a first temperature control system for cooling the hydraulic fluid and pressurized hydraulic fluid based upon a control signal from the controller.

The first temperature control system can be a forced air cooling device.

The ground propulsion system further comprises a second temperature control system for heating the hydraulic fluid when a temperature of the hydraulic fluid is below a preset threshold value.

The second temperature control system comprises a temperature sensor and a heating element. The heating element is a resistive heating element.

The ground propulsion system further comprises a second temperature control system for heating the hydraulic fluid when a viscosity of the hydraulic fluid is below a preset threshold value.

The heating element is located in close proximity to the fluid reservoir.

The ground propulsion system further comprises an electric motor cooling system for cooling the electric motor.

The drive assembly comprises: a gear box coupled to the variable displacement hydraulic motor, a clutch assembly coupled to the at least one wheel axel, the clutch assembly having a first and second position, the first position being an engaged position and the second position being a disengaged position, and a shear assembly having a first end coupled to the gear box and a second end coupled to the clutch assembly. The shear assembly has a mechanical shear point between the gear box and the clutch assembly which breaks a mechanical link between the gear box and the at least one wheel axel to permit the at least one wheel to freely spin if the clutch assembly fails in the engaged position.

The gear box comprises at least one gear adapted to rotate in a first direction and a second direction, the first direction moving the aircraft in a forward direction and the second direction moving the aircraft in a reverse direction.

The at least one wheel comprises a first and second wheel and the at least one wheel axel comprises a first and second wheel axel. The first wheel is rotatably coupled to the first wheel axel and the second wheel is rotatably coupled to the second wheel axel. The ground propulsion system further comprises a second variable displacement motor, a second drive assembly mechanically coupled to the second wheel axel and mechanically coupled to the second variable displacement motor and at least one fluid divider which splits the pressurized hydraulic fluid, from the variable displacement pump, between the variable displacement motor and the second variable displacement motor.

BRIEF DESCRIPTION OF FIGURES

These and other features, benefits, and advantages of the present invention will become apparent by reference to the following figures, with like reference numbers referring to like structures across the views, wherein.

DETAILED DESCRIPTION OF THE INVENTION

Figure 1:
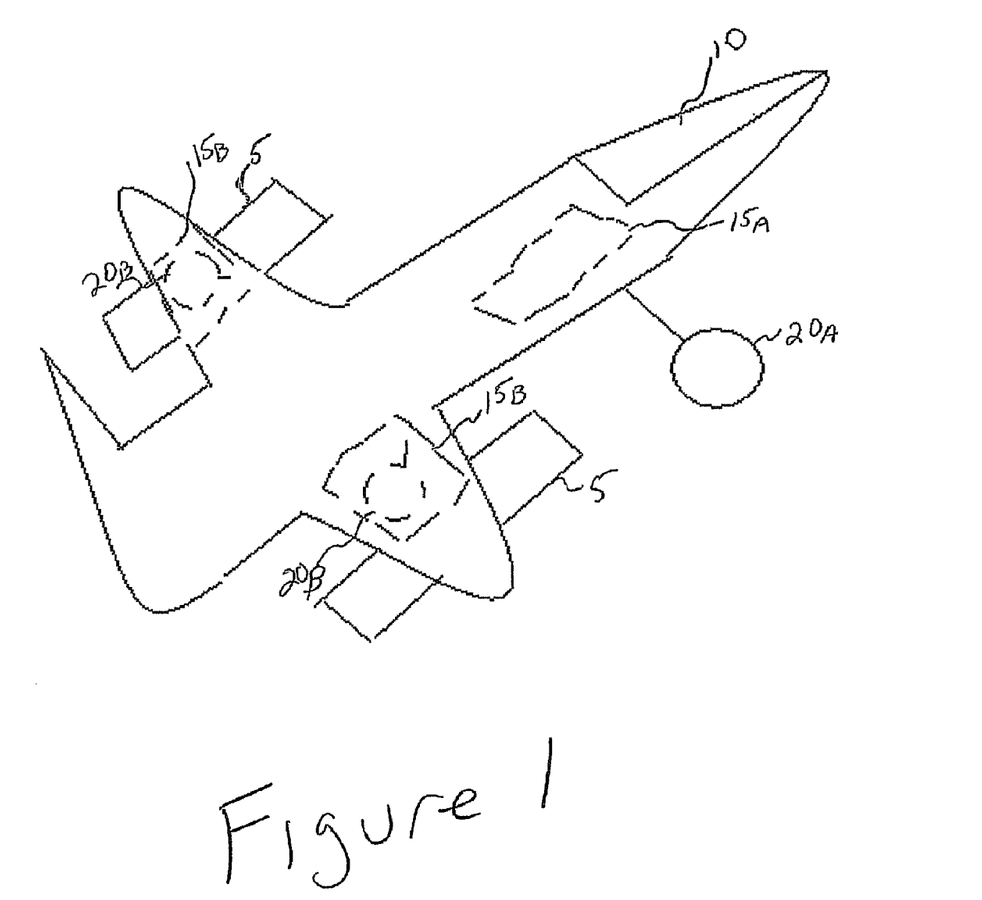
FIG. 1 illustrates an aircraft with a landing gear.

FIG. 1 illustrates an aircraft 1. The aircraft 1 has three sets of wheels for taxiing, takeoff and landing: a nose gear 20A and two rear/main gears 20B (collectively "wheel assemblies"). For purposes of the description the wheel assemblies will be described as wheel assembly 15. During landing the wheel assemblies 20A and 20B are extended from the landing gear bay 15A and 15B, respectively. The extension of the wheel assemblies 20A and 20B are controlled by the pilot in the cockpit 10. The main engines 5 are used to propel the aircraft 1 during takeoff. However, during taxi a hydraulic ground propulsion system as described herein is used to control the speed and torque of the axel/wheels.

Figure 2:
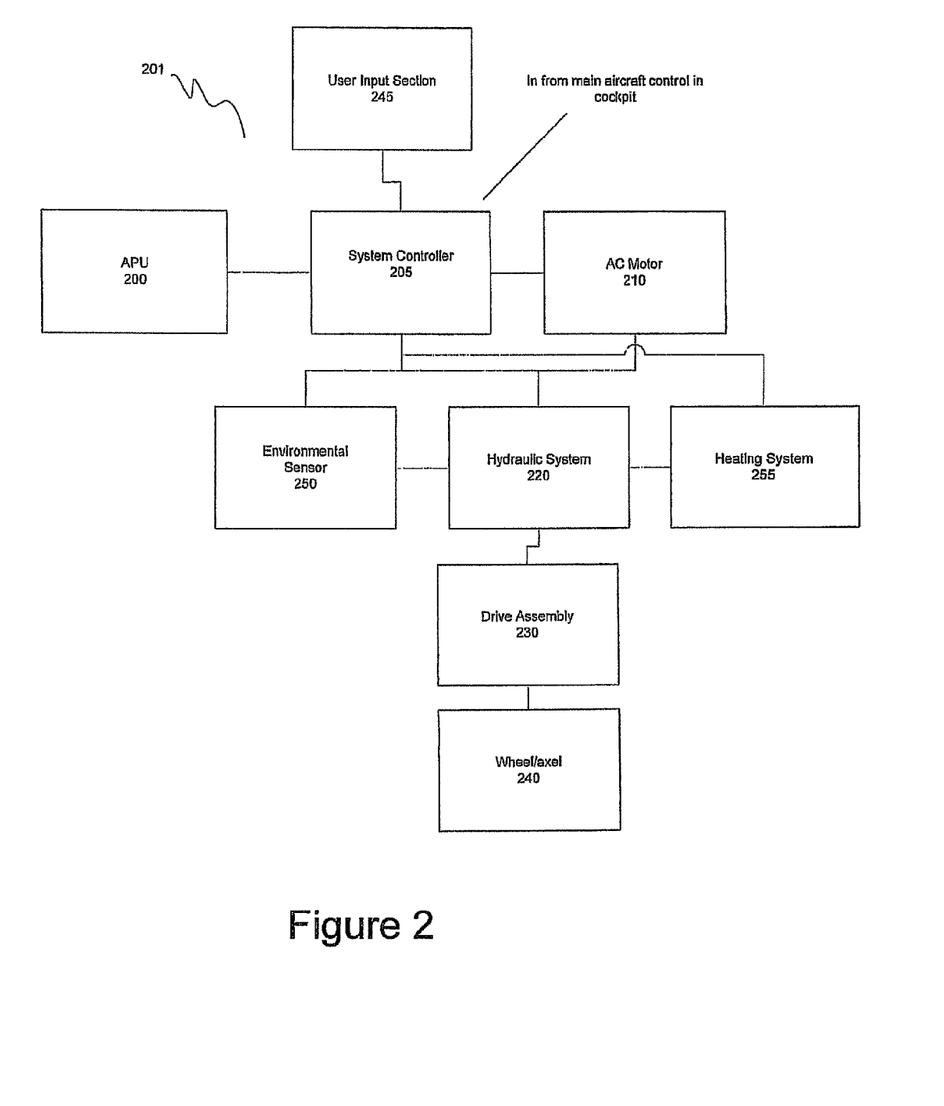
FIG. 2 illustrates a block diagram of a ground propulsion system according to the invention.

FIG. 2 illustrates a block diagram of the hydraulic ground propulsion system 201 according to the invention. The hydraulic ground propulsion system 201 can be included in the nose gear 20A and/or both of the rear/main gears 20B. The hydraulic ground propulsion system 201 has a system controller 205. The system controller 205 can be located anywhere within the aircraft 1. The system controller 205 outputs displacement commands to a hydraulic system 220 to yield the appropriate system output speed and torque. The system controller 205 includes a processing section, memory such as, non-volatile and volatile memory, a clock and various input/output interfaces to interface with the various elements of the hydraulic ground propulsion system 201 and aircraft controllers (not shown). The system controller 205 is programmed to execute the functionality described herein. The program is stored in memory. Additionally, the system controller memory includes the preset thresholds that are described herein.

The hydraulic system 220 is driven by a constant speed AC motor 210 ("AC motor"). The hydraulic system 220 will be described in greater detail with respect FIGS. 4 and 5.

During aircraft taxi maneuvers, the aircraft engines 5 are shut down. The aircraft auxiliary power unit (APU) 200 powers an aircraft 115VAC bus (not shown), which is connected to the AC motor 210 via the system controller 205. The AC motor 210 is shutdown when not in use. The system controller 205 effectively switches the power from the APU 200 to the AC motor 210 on and off. The pilot controls the speed and direction of the taxi using a user input section 245, e.g., a cockpit interface. The user input section 245 can be, but is not limited to, a joystick and throttle pedal. The system controller 205 continuously monitors the pilot command from the user input section 245. Additionally, the system controller 205 can monitor environment sensors 250 and adjust the speed and torque as necessary. The environment sensors 250 can be, but is not limited to, a temperature sensor and a velocity sensor that senses the speed or velocity of the wheels. The temperature sensor detects the temperature of hydraulic fluid moving through the hydraulic system 250. Additionally, the system controller 205 can monitor other aircraft and system parameters such as, but not limited to, air/ground status (i.e. weight on wheels), hydraulic fluid temperature and drain case pressure. The data from the environmental sensors 250 is made available to the system controller 205 via a data bus (not shown).

The AC motor 210 can be cooled using a small cooling system, such as, but not limited to, a forced air system. Additionally, if the AC motor 210 and an hydraulic pump driven by the AC motor 210 are housed in the same assembly, the heat generated by the motor may be carried away from the motor by hydraulic fluid.

As will be described later in greater detail, the system controller 205 also controls a heating system 255 which prevents the hydraulic fluid from freezing while the aircraft 1 is in the air and the ambient temperature is low. The heating system 255 will be also described in greater detail later with respect to FIG. 6.

Figure 3:
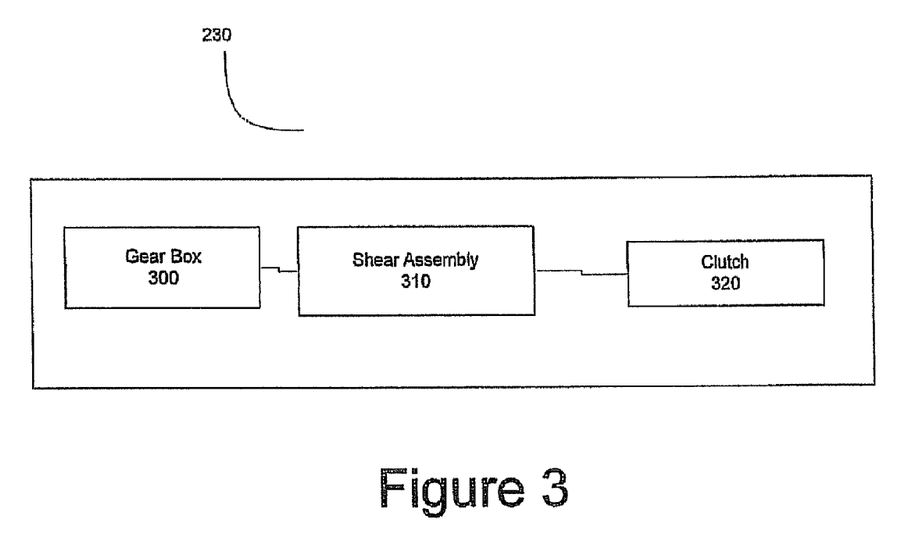
FIG. 3 illustrates a block diagram of a drive system according to the invention.

The hydraulic system 220 is mechanically coupled to a drive assembly 230. FIG. 3 illustrates the drive assembly 230. As illustrated in FIG. 3, the drive assembly 230 includes a gearbox 300 with at least one gear to increase the output torque. A gearbox 300 is located between the hydraulic motor output and wheel/axel 240. A gear is configured to rotate in both a forward and reverse direction.

A clutch 320 in the drive assembly 230 is located between the gearbox 300 and wheel/axel 240 to allow freewheeling during takeoff and landing. The clutch 320 has two positions, one which engages the wheel/axel 240 to the gearbox 300 and the other disengages the wheel/axel 240 from the gearbox 300. The clutch 320 is engaged whenever the hydraulic ground propulsion system 201 is providing torque to move the wheel/axel 240. The clutch 320 is disengaged upon landing, takeoff, power down, or if the taxi speed exceeds a predetermined threshold. The clutch 320 can be a bi-directional free wheel clutch. Additionally, the clutch 320 can be a friction type or jaw clutch. This type of clutch requires a control signal and an actuation means supplied by the system controller 205.

A mechanical shear assembly 310 is located between the gearbox 300 and clutch 320 to break a mechanical link between the wheel/axel 240 and gearbox 300 should the clutch fail in the engaged position. The drive assembly 230 and the wheel/axel 240 are all located in a wheel hub or wheel assembly 20.

The wheel is attached to the axel and configured to freely rotate in a forward or reverse direction.

Figure 4:
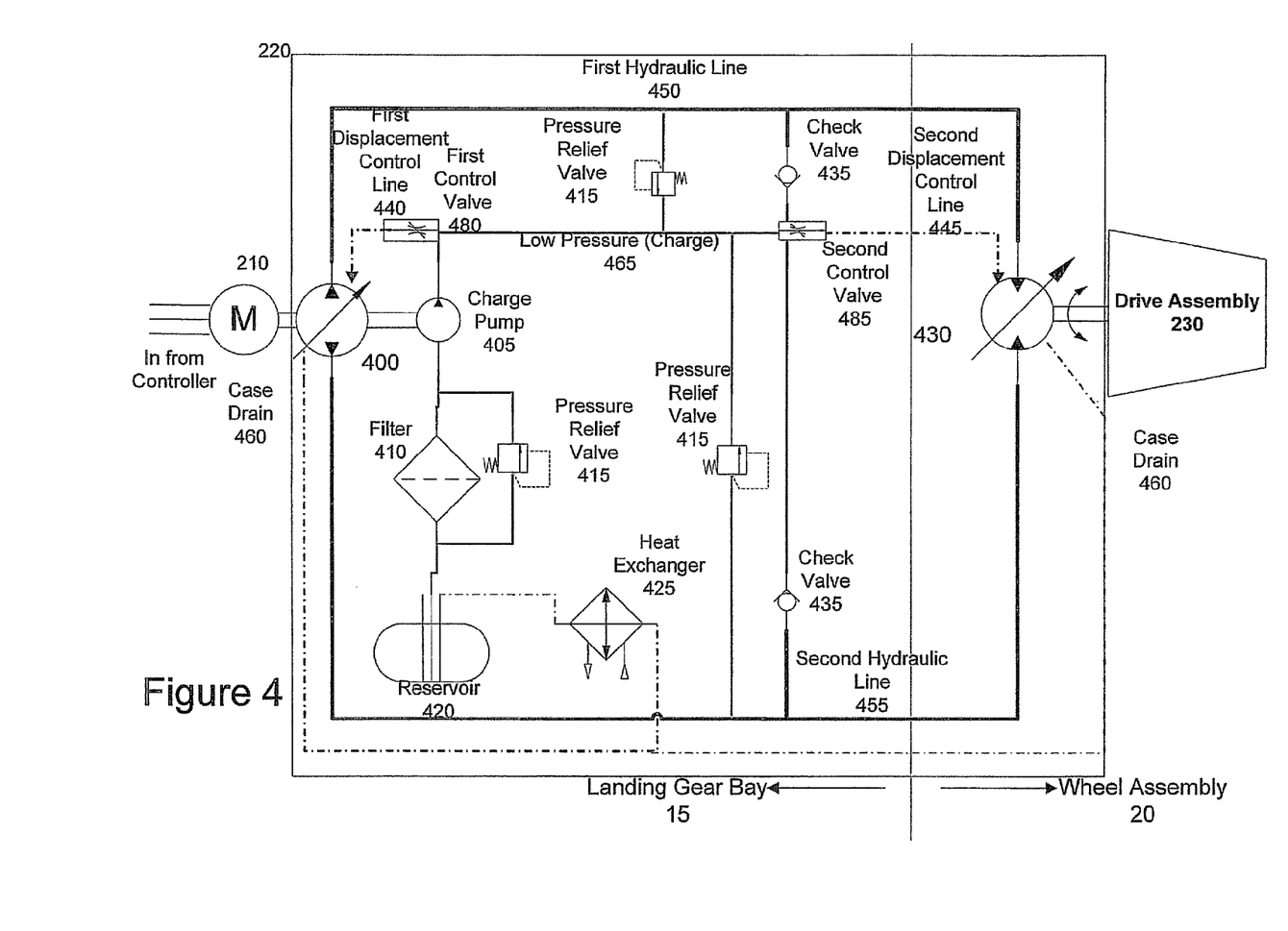
FIG. 4 illustrates a schematic diagram of a portion of a first ground propulsion system in accordance with the invention.

FIG. 4 illustrates a schematic diagram of the electric motor 210, hydraulic system 220 and drive assembly 230 in accordance with the invention.

The AC motor 210 drives a variable displacement hydraulic pump 400, providing pressurized hydraulic fluid to the hydraulic motor 430 via a first hydraulic line 450. The hydraulic fluid is stored in a reservoir 420. A charge pump 405 pumps hydraulic fluid from the reservoir 420 to a low pressure side of the hydraulic pump 400. The charge pump 405 and hydraulic pump 400 are connected on the same torque transferring mechanism, such as but not limited to, a shaft, as AC motor 210 and as such, the AC motor 210 also drives the charge pump 405. The hydraulic fluid returns to the hydraulic pump 400 from the hydraulic motor 430 via the second hydraulic line 455. Additionally, hydraulic fluid lost through internal leakage in the variable displacement hydraulic pump 400 and variable displacement hydraulic motor 430 flows into the case drain 460, passes through a heat exchanger 425 and filter 410, and is then stored in the reservoir 420. The case drain is illustrated by a dashed line in FIGS. 4 and 5.

Any known type of variable displacement hydraulic pump 400 can be used in the variable hydraulic system 220 including, but not limited to, an axial piston pump. An axial piston pump has a swashplate and multiple pistons. The swashplate is connected to the pistons. When the pistons rotate, the angle of the swashplate causes the pistons to move in and out of their respective cylinders. At the output end, a rotary valve alternatively connects each cylinder to first or second hydraulic lines, 450, 455, respectively.

The flow rate of the hydraulic fluid can be varied. For example, in an axial piston pump, the flow rate of the hydraulic fluid can be varied by adjusting an angle of a swashplate (not shown) in a hydraulic pump 400. If the swashplate is perpendicular to an axis of rotation (of the pistons); no fluid will flow. As the angle of the swashplate increases, a larger volume of fluid is pumped.

The first hydraulic line 450 is a high pressure line and the second hydraulic line 455 or the return line is a low pressure line. The pressure relief valve 415 prevents excessive pressure buildup of the hydraulic fluid entering the filter 410.

Additionally, a heat exchanger 425 is provided to prevent a significant temperature increase. The heat exchanger 425 can be, but is not limited to, a forced air system. The heat exchanger 425 can be controlled by the system controller 205 if the exchanger provides its own forced air via a fan. The environmental sensor 250 senses the temperature of the hydraulic fluid. The sensed temperature is transmitted to the system controller 205 via a data bus (not shown). When the sensed temperature is above a preset threshold value, the system controller 205 outputs a control signal to the heat exchanger 425. Responsive to the control signal, the heat exchanger 425 cools the hydraulic fluid.

In the return line to the charge pump 405, a filter 410 is included to remove debris from the hydraulic fluid.

Check valves 435 are located in first and second hydraulic lines 450, 455. The check valves allow hydraulic fluid to pass from the low pressure (charge) line 465 to the first or second hydraulic lines 450, 455, respectively. The check valves 435 provide hydraulic fluid to prime the lines in the hydraulic system 220.

Pressure relief valves 415 are also included in the first and second hydraulic lines (between the low pressure (charge) line and the first and second hydraulic lines 450, 455, respectively) to protect the hydraulic system 220 from over pressurization.

Figure 5:
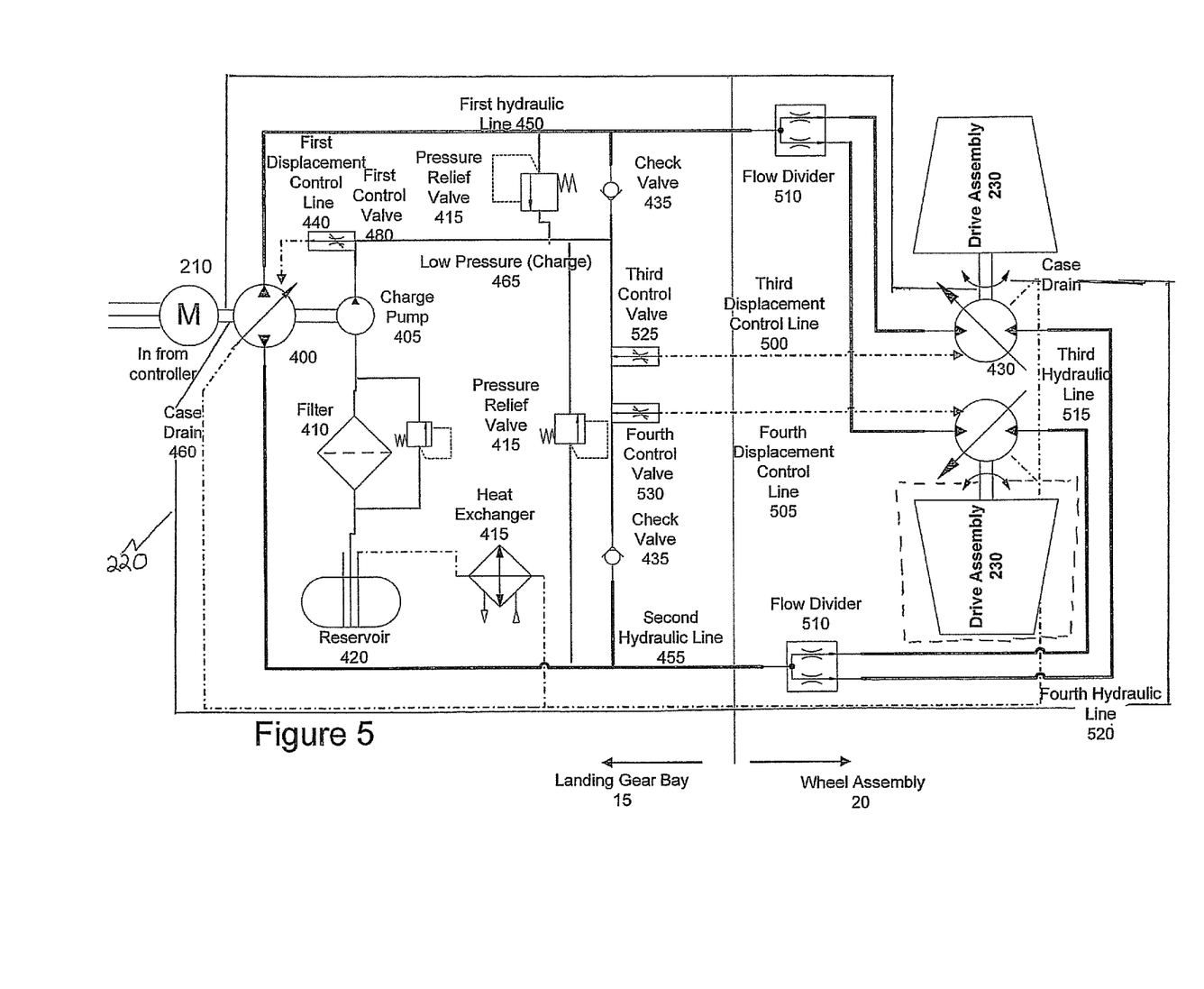
FIG. 5 illustrates a schematic diagram of a portion of a second ground propulsion system in accordance with the invention.

As depicted in FIG. 4, the hydraulic motor 430 is located in the wheel assembly 20. The remaining portions of the hydraulic system 220 are located in the landing gear bay 15. Additionally, the AC motor 210 can be located in the landing gear bay 15. Alternately, the remaining portions of the hydraulic system 220 can be located near the cockpit 10. The system controller 205 can be located in the cockpit 10 or the landing gear bay 15. The dotted lines on FIGS. 4 and 5 illustrate a division between the landing gear bay 15 and the wheel assembly 20.

A system controller 205, based upon a pilot torque command, controls displacement of the variable hydraulic pump and motor, 400, 430, respectively, and ultimately controls torque and speed. The displacement is controlled via the pressure in the first and second displacement control lines 440, 445, respectively. The system controller 205 outputs two displacement signals: one for the pump displacement and the other for the motor displacement. The displacement signals are input to first and second control valves 480, 485, respectively. The first and second control valves 480, 485, converts the electrical control signals from the system controller 205 into hydraulic pressure signals, which are feed into the hydraulic pump 400 and hydraulic motor 430. Alternatively, the electric control signals from the system controller 205 can be directly feed into the hydraulic pump 400 and/or motor 430 (if the pump/motor has an electrical displacement control)

The system controller 205 receives a pilot torque command. The pilot torque command is converted into displacement controls signals for the hydraulic pump 400 and/or motor 430. The torque command can be converted into displacement commands using a displacement look-up table. The look up table will include displacement command corresponding to a change in torque command and current speed/torque of the pump/motor. Alternatively, the system controller 205 can calculate the displacement commands from the torque command and speed/torque of the pump/motor. As the pilot commands more power or speed, more hydraulic fluid is supplied to the hydraulic motor 430.

As such, the speed of AC motor 210 input to the hydraulic pump 400 is completely independent of the output speed and torque.

As depicted in FIG. 4, forward propulsion occurs when the hydraulic fluid moves in a clock-wise direction. Reverse propulsion is generated when the hydraulic fluid moves in a counter-clock-wise direction. The system controller 205 can change the direction of motion through displacement commands as well. For example, when commanded to a negative swash plate angle, the hydraulic pump 400 pressurizes the opposite hydraulic line, i.e. second hydraulic line 455 rather than the first hydraulic line when the swashplate angle is positive. If the high pressure and low pressure lines are swapped relative to the motor input and output, the hydraulic motor 430 will reverse in direction.

Also as depicted in FIG. 4, one hydraulic motor 430 is used to provide the torque for the drive assembly 230. This configuration is used when the wheel/axel 240 assembly comprises one wheel rotatably attached to one axel.

FIG. 5 a schematic diagram of a portion of a second ground propulsion system in accordance with the invention. The configuration illustrated in FIG. 5 is used when the wheel/axel 240 assembly comprises multiple wheels and axels where one wheel is attached to an axel. Many of the elements and features depicted in FIG. 5 have been described with respect to FIG. 4 and will not be described again. Dashed lines around the drive assembly 230 shows that the drive assembly is not part of the hydraulic system 220. Each wheel/axel 240 has its own drive assembly 230. Each drive assembly 230 is configured to be independently driven by a separate variable hydraulic motor 430. The hydraulic fluid from the hydraulic pump 400 is split between the hydraulic motors 430 by a flow divider 510. The flow divider 510 is controlled by the system controller 205. The flow of hydraulic fluid can be unevenly split between the hydraulic motors 430 to provide different flow rates. Additionally, the displacement for each hydraulic motor 430 can be separately varied by a third and fourth displacement control line 500, 505, respectively, where each of the control lines includes a control valve 525, 530, respectively. The system controller 205 separately controls each hydraulic motor 430 by issuing separate displacement commands to the third and fourth control valves 525, 530 in the same manner as described above. This is particularly useful where the pilot inputs a command to turn the aircraft 1. A wheel/axel 240 on the inside of the turning radius would be required to turn slower than a wheel/axel on the outside of the turning radius. The system controller 205 converters the torque command received into separate displacement commands to the variable hydraulic motors 430 and a flow divide command to the flow divider 510.

Figure 6:
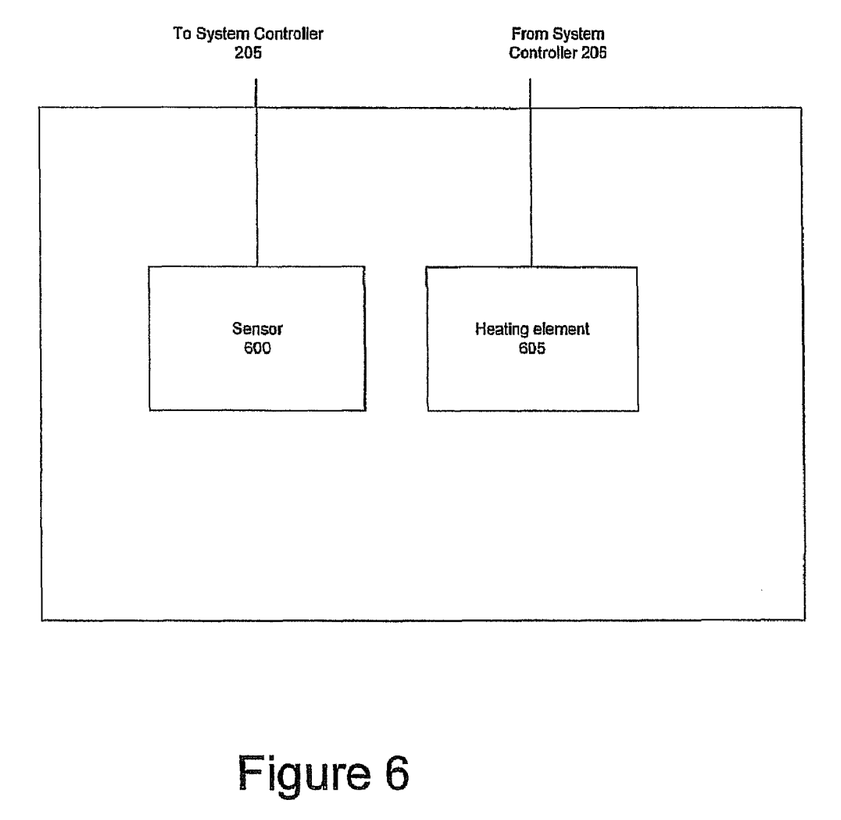
FIG. 6 illustrates a block diagram of a hydraulic fluid heating system according to the invention.

FIG. 6 illustrates a block diagram of a hydraulic fluid heating system 255 according to the invention. The hydraulic fluid heating system 255 heats the hydraulic fluid to prevent the fluid from freezing due to the low ambient temperature while the aircraft 1 is in the air. The hydraulic fluid heating system 255 includes a sensor 600 and a heating element 605. The sensor 600 can be, but is not limited to, a temperature sensor or a viscosity sensor. The heating element 605 can be, but is not limited to, a resistive heating element. The heating element 605 is located near the hydraulic fluid lines, 450, 455, 515, 520. Additionally, the heating element 605 is located around the reservoir 420.

A signal representing the sensed value is transmitted to the system controller 205. The system controller 205 compares the sensed value with a preset threshold value. For example, if the sensed temperature is lower than a preset temperature, the system controller 205 actives the heating element 605. The system controller 205 issues a control signal to the heating element 605. The system controller 205 will temporarily supply power from the APU 200 to the heating element 605.

After taxi, the system controller 205 shuts down the ground propulsion system. The APU 200 is disconnected from AC motor 210 and the displacement commands to the pump 400 and hydraulic motor 430 are suspended. The clutch 305 is disengaged from the wheel/axel 240 and the main engines 5 are powered up to provide the needed thrust for takeoff.

Upon approaching landing, the system controller 205 preheats the hydraulic system 220. The system controller 205 issues a command to the hydraulic motor 430 to place the motor in a neutral mode. The system controller 205 can issue the command when it receives a pilot command via the user input section 245. Alternatively, the system controller 205 can automatically issue the command at a preset time prior to landing. The time will be based upon the total expected flight time and the current time. The total expected flight time is retrieved from the cockpit 10. Once the system controller 205 detects that the hydraulic motor 430 is in a neutral mode, the system controller 205 connects the 115VAC electrical bus to the AC motor 210, thereby powering the hydraulic system 220. The hydraulic pump 400 pumps the cold fluid into the first hydraulic line 450. The charge pump 405 pumps the hydraulic fluid from the reservoir 420 into the hydraulic pump 400. The hydraulic fluid warms up as it flows through the first and second hydraulic lines, 450, 455, respectively. Additionally, the fluid warms up by mixing with the heated fluid in the reservoir 420 and by the natural pressure loss in the hydraulic system 220.

Additionally, just prior to landing, the wheel(s)/axel(s) 240 can be pre-spun. This will avoid wear on the wheels and shock. The system controller 205 temporarily connects the 115VAC electrical bus to the AC motor 210, thereby powering the hydraulic system 220. The 115VAC can be powered by generators coupled to the main aircraft engines 5. The hydraulic pump 400, charge pump 405 and hydraulic motor 430 are activated. The system controller 205 will issue a low displacement command to the hydraulic pump 400 and hydraulic motor 430 via the first and second displacement control lines, 440, 445, respectively, or first, third and fourth displacement control lines, 440, 500, 505, respectively. If the wheel assembly 20 includes more than one wheel, the system controller 205 issues a command to the flow divider 510 to split the flow between the hydraulic motors 430. The flow rate through the first hydraulic line 450 is small and therefore, the wheel(s)/axel(s) 240 will slowly rotate. The displacement and flow rate can be increased gradually, i.e., ramped up when landing is imminent.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as "system."

Various aspects of the present invention may be embodied as a program, software, or computer instructions embodied in a computer or machine usable or readable medium, which causes the computer or machine to perform the steps of the method(s) disclosed herein when executed on the computer, processor, and/or machine. A program storage device readable by a machine, tangibly embodying a program of instructions executable by the machine to perform various functionalities and methods described in the present disclosure is also provided.

The system and method of the present invention may be implemented and run on a general-purpose computer or special-purpose computer system. The computer system may be any type of known or will be known systems.

The above description provides illustrative examples and it should not be construed that the present invention is limited to these particular example. Thus, various changes and modifications may be effected by one skilled in the art without departing from the spirit or scope of the invention as defined in the appended claims.

What is claimed is:

1. A ground propulsion system for an aircraft comprising:
   at least one wheel axel;
   at least one wheel rotatably coupled to said at least one wheel axel;

an aircraft power interface device which interfaces an aircraft power source;
an electric motor coupled to the aircraft power interface device that receives power from said aircraft power source through the aircraft power interface device;
a hydraulic system driven by the electric motor, said hydraulic system comprising a charge pump having a first and a second end, the first end being attached to a fluid reservoir and the second end being attached to a variable displacement hydraulic pump, said charge pump pumping hydraulic fluid from the fluid reservoir to the variable displacement hydraulic pump, said charge pump being driven by said electric motor;
a drive assembly mechanically coupled to said at least one wheel axel and mechanically coupled to said hydraulic system, said drive assembly being mechanically driven by said hydraulic system, said drive assembly transferring energy from said hydraulic system to said at least one wheel axel; and
a controller for controlling said electric motor and said hydraulic system based upon a pilot torque command.

2. The ground propulsion system for an aircraft according to claim 1, wherein said electric motor is a constant speed AC motor providing a power source to said hydraulic system.

3. The ground propulsion system for an aircraft according to claim 1, wherein said hydraulic system further comprises:
the fluid reservoir for storing the hydraulic fluid for the hydraulic system;
the variable displacement hydraulic pump variably supplying a pressurized hydraulic fluid based upon a first displacement control signal from said controller, said electric motor providing displacement torque to said variable displacement hydraulic pump;
and a variable displacement hydraulic motor variably providing mechanical energy to said drive assembly based upon a second displacement control signal from said controller, said variable displacement hydraulic motor being supplied with said pressurized hydraulic fluid.

4. The ground propulsion system for an aircraft according to claim 3, wherein said hydraulic system further comprises:
a first hydraulic line having a first and second end, said first end being connected to said variable displacement hydraulic pump and said second end being connected to said variable displacement hydraulic motor; and
a second hydraulic line having a first and second end, said first end being connected to said variable displacement hydraulic motor and said second end being connected to said variable displacement hydraulic pump.

5. The ground propulsion system for an aircraft according to claim 4, wherein said hydraulic system further comprises:
a first hydraulic pressure control line attached to said variable displacement hydraulic pump for adjusting a displacement of said variable displacement pump based upon said first displacement control signal from said controller; and
a second hydraulic pressure control line attached to said variable displacement hydraulic motor for adjusting a displacement of said variable displacement motor based upon said second displacement control signal from said controller.

6. The ground propulsion system for an aircraft according to claim 3, wherein said hydraulic system further comprises:
a first temperature control system for cooling said hydraulic fluid and pressurized hydraulic fluid based upon a control signal from said controller.

7. The ground propulsion system for an aircraft according to claim 6, wherein said first temperature control system comprises a forced air cooling device.

8. The ground propulsion system for an aircraft according to claim 3, wherein said drive assembly comprises:
a gear box coupled to said variable displacement hydraulic motor;
a clutch assembly coupled to said at least one wheel axel, said clutch assembly having a first and second position, said first position being an engaged position and said second position being a disengaged position; and
a shear assembly having a first end coupled to said gear box and a second end coupled to said clutch assembly.

9. The ground propulsion system for an aircraft according to claim 8, wherein said shear assembly has a mechanical shear point between said gear box and said clutch assembly which breaks a mechanical link between said gear box and said at least one wheel axel to permit the at least one wheel to freely spin if said clutch assembly fails in the engaged position.

10. The ground propulsion system for an aircraft according to claim 8, wherein said gear box comprises at least one gear adapted to rotate in a first direction and a second direction, said first direction moving the aircraft in a forward direction and said second direction moving the aircraft in a reverse direction.

11. The ground propulsion system for an aircraft according to claim 6, further comprising:
a second temperature control system for heating said hydraulic fluid when a temperature of said hydraulic fluid is below a preset threshold value.

12. The ground propulsion system for an aircraft according to claim 11, wherein said second temperature control system comprises a temperature sensor and a heating element.

13. The ground propulsion system for an aircraft according to claim 12, wherein said heating element is a resistive heating element.

14. The ground propulsion system for an aircraft according to claim 6, further comprising:
a second temperature control system for heating said hydraulic fluid when a viscosity of said hydraulic fluid is below a preset threshold value.

15. The ground propulsion system for an aircraft according to claim 12, wherein said heating element is located in close proximity to said fluid reservoir.

16. The ground propulsion system for an aircraft according to claim 3, wherein said variable displacement hydraulic motor has a neutral mode, and when said aircraft is within a preset period of time prior to landing, said controller activates said variable displacement hydraulic pump with said variable displacement hydraulic motor set to said neutral mode.

17. The ground propulsion system for an aircraft according to claim 2, further comprising an electric motor cooling system for cooling said electric motor.

18. The ground propulsion system for an aircraft according to claim 4, wherein said variable displacement hydraulic pump and variable displacement hydraulic motor are bi-directional.

19. The ground propulsion system for an aircraft according to claim 3, wherein said variable displacement hydraulic motor, said drive assembly, said at least one wheel axel and said at least one wheel are located in a wheel hub.

20. The ground propulsion system for an aircraft according to claim 3, wherein said variable displacement hydraulic pump, said fluid reservoir, said controller and said electric motor are located in a landing gear bay.

21. The ground propulsion system for an aircraft according to claim 1, wherein said controller controlling said electric motor and said hydraulic system based upon a pilot torque command and at least one environmental parameter.

22. The ground propulsion system for an aircraft according to claim 21, wherein said at least one environmental parameter is a wheel speed.

23. The ground propulsion system for an aircraft according to claim 21, wherein said at least one environmental parameter is an aircraft status, said aircraft status being a member of a group consisting of in air and on ground.

24. The ground propulsion system for an aircraft according to claim 21, wherein said at least one environmental parameter is a hydraulic fluid temperature.

25. The ground propulsion system for an aircraft according to claim 21, wherein said at least one environmental parameter is a drain case pressure.

26. The ground propulsion system for an aircraft according to claim 3, wherein said controller independently controls said variable displacement hydraulic pump and said variable displacement hydraulic motor.

27. The ground propulsion system for an aircraft according to claim 3, wherein said at least one wheel comprises a first and second wheel and said at least one wheel axel comprises a first and second wheel axel, said first wheel being rotatably coupled to said first wheel axel and said second wheel being rotatably coupled to said second wheel axel, said system further comprising:
 a second variable displacement motor;
 a second drive assembly mechanically coupled to said second wheel axel and mechanically coupled to said second variable displacement motor; and
 at least one fluid divider which splits said pressurized hydraulic fluid, from said variable displacement pump, between said variable displacement motor and said second variable displacement motor.

* * * * *